United States Patent
Xiao et al.

(10) Patent No.: US 11,317,340 B2
(45) Date of Patent: Apr. 26, 2022

(54) METHOD AND DEVICE FOR ENABLING ACCESS OF AN UNCONFIGURED DEVICE TO A NETWORK HOTSPOT DEVICE

(71) Applicant: ALIBABA GROUP HOLDING LIMITED, Grand Cayman (KY)

(72) Inventors: Yuezhen Xiao, Shanghai (CN); Chen Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/945,182

(22) Filed: Jul. 31, 2020

(65) Prior Publication Data
US 2020/0367143 A1 Nov. 19, 2020

Related U.S. Application Data

(63) Continuation of application No. PCT/CN2019/072482, filed on Jan. 29, 2019.

(30) Foreign Application Priority Data

Jan. 31, 2018 (CN) .......................... 201810098029.6

(51) Int. Cl.
*H04W 4/00* (2018.01)
*H04W 48/08* (2009.01)
(Continued)

(52) U.S. Cl.
CPC ......... *H04W 48/08* (2013.01); *H04L 63/0435* (2013.01); *H04W 12/06* (2013.01); *H04W 12/08* (2013.01); *H04W 48/16* (2013.01)

(58) Field of Classification Search
CPC ..... H04W 48/08; H04W 12/06; H04W 12/08; H04W 48/16; H04W 12/02; H04L 63/0435; H04L 29/06
(Continued)

(56) References Cited

U.S. PATENT DOCUMENTS 9,572,034 B1 * 2/2017 Lu ....................... H04W 12/033
9,648,548 B1 5/2017 Gan et al.
(Continued)

FOREIGN PATENT DOCUMENTS

| CN | 104780556 A | 7/2015 |
| CN | 105517012 A | 4/2016 |

(Continued)

OTHER PUBLICATIONS

PCT International Search Report.

*Primary Examiner* — Mark G. Pannell
(74) *Attorney, Agent, or Firm* — Finnegan, Henderson, Farabow, Garrett & Dunner, LLP

(57) ABSTRACT

Embodiments of the present disclosure provide methods and devices for enabling access of an unconfigured device to a network hotspot device. The network hotspot device creates a first hotspot and a second hotspot. The method can include: in response to first access information of the first hotspot having been updated, disabling, by the network hotspot device, a connection between the first hotspot of the network hotspot device and the unconfigured device that has accessed the network hotspot device through the first hotspot; and in response to the unconfigured device accessing the second hotspot, sending, by the network hotspot device, the updated first access information to the unconfigured device through the second hotspot, wherein the unconfigured device is configured to access the first hotspot using the updated first access information.

20 Claims, 5 Drawing Sheets

(51) Int. Cl.
*H04L 29/06* (2006.01)
*H04W 12/06* (2021.01)
*H04W 12/08* (2021.01)
*H04W 48/16* (2009.01)

(58) Field of Classification Search
USPC .......................................................... 370/338
See application file for complete search history.

(56) References Cited

U.S. PATENT DOCUMENTS

| | | | |
|---|---|---|---|
| 2013/0347073 A1* | 12/2013 | Bryksa .................. | G06Q 10/02 726/4 |
| 2014/0250513 A1* | 9/2014 | Cao ....................... | H04W 12/50 726/7 |
| 2017/0181047 A1* | 6/2017 | Cai ....................... | H04W 36/03 |
| 2019/0223248 A1* | 7/2019 | Chandran .............. | H04W 12/06 |
| 2020/0288517 A1* | 9/2020 | Wang ..................... | H04W 76/14 |

FOREIGN PATENT DOCUMENTS

| | | |
|---|---|---|
| CN | 107124341 A | 9/2017 |
| WO | WO 2019/149097 A1 | 8/2019 |

\* cited by examiner

In response to first access information of the first hotspot having been updated, disabling, by the network hotspot device, a connection between the first hotspot of the network hotspot device and the unconfigured device that has accessed the network hotspot device through the first hotspot ~ 101

Accessing, by the unconfigured device, the second hotspot ~ 102

Sending, by the network hotspot device, the updated first access information to the unconfigured device through the second hotspot ~ 103

The unconfigured device is configured to access the first hotspot using the updated first access information ~ 104

*FIG. 1*

201 — In response to first access information of the first hotspot having been updated, disabling, by the network hotspot device, a connection between the first hotspot of the network hotspot device and the unconfigured device that has accessed the network hotspot device through the first hotspot 202 — Accessing, by the unconfigured device, the second hotspot 203 — Receiving, by the network hotspot device, device information of the unconfigured device sent by the unconfigured device through the second hotspot 204 — Encrypting, by the network hotspot device, the updated first access information with the device information; and sending, by the network hotspot device, the encrypted first access information to the unconfigured device 205 — Decrypting, by the unconfigured device, the encrypted first access information using the device information, and accessing the first hotspot using the decrypted first access information

*FIG. 2*

```
┌─────────────────────────────────────────────────────────────┐
│ In response to first access information of the first hotspot│
│ having been updated, disabling, by the network hotspot      │
│ device, a connection between the first hotspot of the       │──── 301
│ network hotspot device and the unconfigured device that has │
│ accessed the network hotspot device through the first       │
│ hotspot                                                     │
└─────────────────────────────────────────────────────────────┘
                              │
┌─────────────────────────────────────────────────────────────┐
│    Accessing, by the unconfigured device, the second hotspot│──── 302
└─────────────────────────────────────────────────────────────┘
                              │
┌─────────────────────────────────────────────────────────────┐
│ Determining, by the network hotspot device, whether the     │──── 303
│ unconfigured device is in a white list                      │
└─────────────────────────────────────────────────────────────┘
                              │
┌─────────────────────────────────────────────────────────────┐
│ In response to the unconfigured device being in the white   │
│ list, accepting, by the network hotspot device, the device  │──── 304
│ information sent by the unconfigured device                 │
└─────────────────────────────────────────────────────────────┘
                              │
┌─────────────────────────────────────────────────────────────┐
│ Encrypting, by the network hotspot device, the updated first│
│ access information with the device information; and sending,│
│ by the network hotspot device, the encrypted first access   │──── 305
│ information to the unconfigured device                      │
└─────────────────────────────────────────────────────────────┘
                              │
┌─────────────────────────────────────────────────────────────┐
│ Decrypting, by the unconfigured device, the encrypted first │
│ access information using the device information, and        │──── 306
│ accessing the first hotspot using the decrypted first access│
│ information                                                 │
└─────────────────────────────────────────────────────────────┘
```

*FIG. 3*

METHOD AND DEVICE FOR ENABLING ACCESS OF AN UNCONFIGURED DEVICE TO A NETWORK HOTSPOT DEVICE

CROSS-REFERENCE TO RELATED APPLICATION

The present disclosure claims the benefits of priority to International Application No. PCT/CN2019/072482, filed on Jan. 21, 2019, which claims priority to Chinese Patent Application No. 201810098029.6 filed on Jan. 31, 2018, both of which are incorporated herein by reference in their entireties.

BACKGROUND

With the development of the Internet of Things, more and more smart devices use Wi-Fi to access home routers to realize functions such as remote device control and scene linkage in smart home scenarios.

Before accessing to the Internet, smart devices need to obtain Service Set Identifier (SSID) and a password of a router based on network configuration schemes to access the Internet. The current configuration scheme is mainly realized by Wi-Fi or Bluetooth.

Regardless of whether it is by means of Wi-Fi or Bluetooth, the user needs to manually enter the SSID and the password during the network configuration. There is a risk of input errors. After a user updates a router access information of the router, the smart device connected to the router requires the user to configure the smart device again, which negatively affect the user experience.

SUMMARY

Embodiments of the present disclosure provide methods and devices for enabling access of an unconfigured device to a network hotspot device. The network hotspot device creates a first hotspot and a second hotspot. The method can include: in response to first access information of the first hotspot having been updated, disabling, by the network hotspot device, a connection between the first hotspot of the network hotspot device and the unconfigured device that has accessed the network hotspot device through the first hotspot; and in response to the unconfigured device accessing the second hotspot, sending, by the network hotspot device, the updated first access information to the unconfigured device through the second hotspot, wherein the unconfigured device is configured to access the first hotspot using the updated first access information.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 1 illustrates a flow chart of an exemplary method for enabling access of an unconfigured device to a network hotspot device, consistent with some embodiments of the present disclosure.

FIG. 2 illustrates a flow chart of an exemplary method for enabling access of an unconfigured device to a network hotspot device, consistent with some embodiments of the present disclosure.

FIG. 3 illustrates a flow chart of an exemplary method for enabling access of an unconfigured device to a network hotspot device, consistent with some embodiments of the present disclosure.

DETAILED DESCRIPTION

Figure 4:
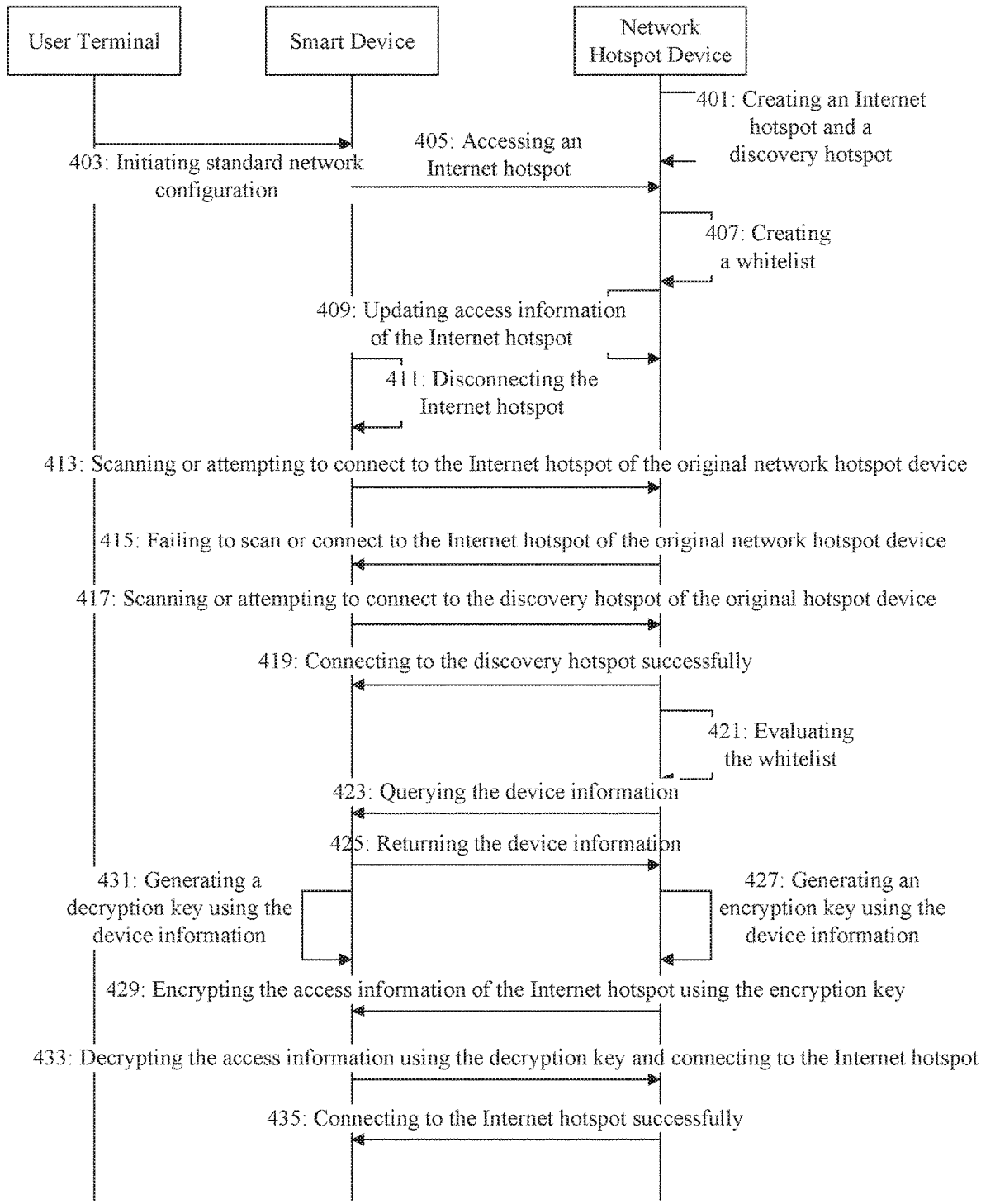
FIG. 4 illustrates a flow chart of an exemplary method for enabling access of an unconfigured device to a network hotspot device, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

In an Internet of Things scenario, a router is used to provide Wi-Fi hotspots for smart devices. The router can provide hotspots with Internet access and hotspots without Internet access. This kind of hotspot with the ability to access the Internet can be called an online hotspot.

Sending access information of network hotspots to smart devices is network configuration. The access information includes Service Set Identifier (SSID) and password of the hotspot.

When the user updates access information of the hotspot the router, the smart device connected to the router requires the user to configure the smart device again.

FIG. 1 illustrates a flow chart of an exemplary method for enabling access of an unconfigured device to a network hotspot device, consistent with some embodiments of the present disclosure. The network hotspot creates a first hotspot and a second hotspot. The method can include the following steps.

In step 101, in response to first access information of the first hotspot having been updated, disabling, by the network hotspot device, a connection between the first hotspot of the network hotspot device and the unconfigured device that has accessed the network hotspot device through the first hotspot.

In some embodiments, the network hotspot device can be a router or a wireless Access Point (AP) without routing capabilities.

The network hotspot creates a first hotspot and a second hotspot after power-on. The first hotspot is an Internet accessing hotspot that is capable of accessing the Internet. The second hotspot is a discovery hotspot that is not capable of accessing the Internet. If the unconfigured device accesses the first hotspot, the unconfigured device can communicate with the network hotspot device and can also access the Internet through the network hotspot device. If the unconfigured device accesses the second hotspot, the unconfigured device can communicate with the network hotspot device but cannot access the Internet through the network hotspot device.

The unconfigured device uses the first access information (e.g., SSID and password) corresponding to the first hotspot to access the first hotspot. After the user updates the first access information of the first hotspot, the network hotspot device disconnects the unconfigured device from the first hotspot. The step of updating the access information by the user includes: the user creates new access information, and the user modifies the original access information.

In step 102, the unconfigured device accesses the second hotspot.

After the network hotspot device disconnects the unconfigured device from the first hotspot, the unconfigured device again tries to use the old first access information to access the first hotspot, but access failure can occur. The unconfigured device also uses the access information for other Internet hotspots to try to access other Internet hotspots.

After the unconfigured device fails to access the Internet hotspot, the unconfigured device accesses the second hotspot of the network hotspot device.

In step 103, the network hotspot device sends the updated first access information to the unconfigured device through the second hotspot.

In step 104, the unconfigured device accesses the first hotspot using the updated first access information.

The unconfigured device receives the first access information sent by the network hotspot device through the second hotspot, and then the unconfigured device disconnects from the second hotspot and uses the decrypted first access information to re-access the first hotspot.

In some embodiments, the user updates the access information of the Internet hotspot of the network hotspot device, causing the unconfigured device to be disconnected. However, the unconfigured device can access the discovery hotspot of the network hotspot device. The network hotspot device can send the updated access information of the Internet hotspot to the unconfigured device through the discover hotspot. The unconfigured device can access the Internet access hotspot of the network hotspot device using the access information.

The embodiments of the present disclosure provide solutions to the issue of repeated network configuration of the device after the access information of the Internet hotspot being updated. The entire process is transparent to users, does not require user participation, and has an improved user experience.

FIG. 2 illustrates a flow chart of an exemplary method for enabling access of an unconfigured device to a network hotspot device, consistent with some embodiments of the present disclosure. The network hotspot creates a first hotspot and a second hotspot. The method can include the following steps.

Step 201 is the same as Step 101 of FIG. 1.

Step 202 is the same as Step 102 of FIG. 1.

In step 203, the network hotspot device obtains device information sent by the unconfigured device through the second hotspot.

When the unconfigured device accesses the second hotspot, the unconfigured device can send its own device information to the network hotspot device through the second hotspot. Device information can include the device's MAC address, random number, and other data defined by the manufacturer of the device (such as device name and device key).

In step 204, the network hotspot device uses the device information to encrypt the updated first access information and sends the encrypted first access information to the unconfigured device.

In step 205, the unconfigured device uses the device information to decrypt the encrypted first access information and uses the decrypted first access information to access the first hotspot.

The unconfigured device receives the encrypted first access information sent by the network hotspot device through the second hotspot, and then uses its own device information to decrypt the encrypted first access information. Then, the unconfigured device disconnects the second hotspot and uses the decrypted first access information to re-access the first hotspot.

In some embodiments of the present disclosure, when the user updates the access information of the Internet accessing hotspot of the network hotspot device, the unconfigured device becomes disconnected, although it can access the discovery hotspot of the network hotspot device. Device information is sent to the network hotspot device through the discovery hotspot. The network hotspot device uses the device information to encrypt the updated access information of the Internet accessing hotspot, and then sends the encrypted access information to the unconfigured device. The unconfigured device uses its own device information to decrypt the encrypted access information, and then uses the decrypted access information to access the Internet accessing hotspot of the network hotspot device.

The embodiments of the present disclosure provide solutions to the issue of repeated network configuration of the device after the access information of the Internet hotspot being updated. The entire process is transparent to users, does not require user participation, and has an improved user experience. The entire process uses encryption measures to ensure data security, and uses device information for encryption, which can ensure the uniqueness of encryption for each device and has a high security level.

FIG. 3 illustrates a flow chart of an exemplary method for enabling access of an unconfigured device to a network hotspot device, consistent with some embodiments of the present disclosure. The network hotspot creates a first hotspot and a second hotspot. The method can include the following steps.

Step 301 is the same as step 101 of FIG. 1 and step 201 of FIG. 2.

Step 302 is the same as step 102 of FIG. 1 and step 202 of FIG. 2.

In step 303, the network hotspot device determines whether the unconfigured device is in a preset white list.

The white list records the list of unconfigured devices that are allowed to access the first hotspot. If the unconfigured device is in the white list, the network hotspot device performs the process of sending the first access information to unconfigured device; if the unconfigured device is not in the white list, the network hotspot device does not send the first access information to the unconfigured device.

The white list can be stored locally on the network hotspot device. Preferably, the white list can also be stored in the server. Storing the white list in the server can prevent the white list from being leaked due to local attacks.

In some embodiments, the method can further include: the network hotspot device receives a preset white list sent by the server.

The unconfigured devices in the white list can also be configured by the user or can be added by the network hotspot device itself.

In some embodiments, after the network hotspot device accesses the first hot spot for the first time, the network hotspot device adds the network hotspot device to the preset white list.

Specifically, after the device to be allocated network uses the first access information to access the first hotspot of the network hotspot device, the network hotspot device can add the device to be allocated to the white list.

In step 304, if the unconfigured device is in the preset white list, the network hotspot receives the device information sent by the unconfigured device.

After the unconfigured device accesses the second hotspot, the unconfigured device can send its own device information to the network hotspot device through the second hotspot. If the unconfigured device is in the white list, the network hotspot device accepts the device information of the unconfigured device.

Specifically, if the unconfigured device is in the preset white list, the network hotspot device can send a device information query request message to the unconfigured device through the second network hotspot. After receiving the device information query request message, the unconfigured device sends the device information to the network hotspot device.

In some embodiments, if the unconfigured device is not in the preset white list, the network hotspot device disconnects the unconfigured device from the second hotspot.

Specifically, if the unconfigured device is not in the white list, the network hotspot device does not accept the device information of the unconfigured device and disconnects the unconfigured device from the second hotspot.

In step 305, the network hotspot device uses the device information to encrypt the updated first access information and sends the encrypted first access information to the unconfigured device.

Step 305 can include the following sub-steps.

In sub-step S11, the network hotspot device uses the device information to generate an encryption key.

In some embodiments, the network hotspot device can use the device information to generate an encryption key according to a specific key algorithm.

Specifically, for some symmetric encryption algorithms, the encryption key and the decryption key are required to be a bit string of a specific length. Therefore, it is necessary to generate the encryption key of the specific length according to a specific key algorithm.

In sub-step S12, the network hotspot device uses the encryption key to encrypt the updated first access information according to a preset symmetric encryption algorithm.

The symmetric encryption algorithm refers to an algorithm that the encrypting party and the decrypting party can use the same key for encryption and decryption, for example, Advanced Encryption Standard (AES) symmetric encryption algorithm, RC5 symmetric encryption algorithm.

After the encryption party uses the encryption key to encrypt the data according to the encryption algorithm, the decryption party can use the same decryption key as the encryption key to decrypt the encrypted data according to the inverse algorithm corresponding to the encryption algorithm.

In step 306, the unconfigured device uses the device information to decrypt the encrypted first access information and uses the decrypted first access information to access the first hotspot.

Step 306 can include the following sub-steps.

In sub-step S21, the unconfigured device uses the device information to generate a decryption key. The decryption key can be generated according to a specific key algorithm.

Since the symmetric encryption algorithm requires that the decryption key is the same as the encryption key, the unconfigured device and the network hotspot device use the same key algorithm to generate the encryption key or the decryption key.

In sub-step S22, the unconfigured device uses the decryption key to decrypt the encrypted first access information according to an inverse algorithm corresponding to the preset symmetric encryption algorithm.

The decryption key of the unconfigured device is the same as the encryption key of the network hotspot device. During decryption, the unconfigured device uses an inverse algorithm corresponding to the symmetric encryption algorithm to decrypt the encrypted first access information.

In some embodiments, when the user updates the access information of the Internet hotspot of the network hotspot device, the unconfigured device is disconnected. The unconfigured device can be connected to the discovery hotspot of the network hotspot device. The network hotspot device judges whether the unconfigured device is in the preset white list. If the unconfigured device is in the white list, the network hotspot device accepts the device information sent by the unconfigured device through the discovery hotspot.

The network hotspot device uses the device information to generate an encryption key, and then uses a symmetric encryption algorithm to encrypt the updated access information of the Internet accessing hotspot, and then sends the encrypted access information to the unconfigured device.

The unconfigured device uses its own device information to generate a decryption key, and then decrypts the encrypted access information according to the inverse algorithm corresponding to the symmetric encryption algorithm, and then uses the access information to access the Internet hotspot of the network hotspot device.

The embodiments of the present disclosure provide solutions to the issue of repeated network configuration of the device after the access information of the Internet hotspot being updated. The entire process is transparent to users, does not require user participation, and has an improved user experience. The entire process uses encryption measures to ensure data security, and uses device information for encryption, which can ensure the uniqueness of encryption for each device and has a high security level.

FIG. 4 illustrates a flow chart of an exemplary method for enabling access of an unconfigured device to a network hotspot device, consistent with some embodiments of the present disclosure.

In step 401, the network hotspot device creates an Internet hotspot and a discovery hotspot after power-on.

In step 403, a user terminal initiates standard network configuration to a smart device. The user can configure the smart device through the user terminal, so that the smart device can access the hotspot of the network hotspot device.

In step 405, the smart device accesses the Internet hotspot.

In step 407, the network hotspot device creates a white list. After the smart device is connected to the Internet hotspot, the network hotspot device adds the smart device to the white list.

In step 409, the smart device updates access information of the Internet hotspot.

In step 411, after the user updates the access information of the Internet hotspot, the network hotspot device disconnects the smart device from the Internet hotspot, causing the smart device to go offline.

In step 413, after the smart device goes offline, the smart device scans or attempts to connect to the Internet hotspot of the original network hotspot device.

In step 415, the smart device fails to scan or connect to the Internet hotspot of the original network hotspot device.

In step 417, the smart device scans or attempts to connect to the discovery hotspot of the original network hotspot device.

In step 419, connecting to the discovery hotspot of the network hotspot device by the smart device is determined successful.

In step 421, after the smart device connects to the discovery hot spot successfully, the network hotspot device evaluates the white list to determine whether the smart device is in the white list.

In step 423, if the smart device is in the white list, the network hotspot device queries the device information of the smart device.

In step 425, the smart device sends its own device information to the network hotspot device.

In step 427, the network hotspot device uses the device information to generate an encryption key.

In step 429, the network hotspot device uses the encryption key to encrypt the updated access information for the Internet hotspot according to a symmetric encryption algorithm, and then sends the encrypted access information to the smart device.

In step 431, the smart device uses the device information to generate the same decryption key as the encryption key.

In step 433, the smart device uses the decryption key, decrypts the access information according to the inverse algorithm corresponding to the symmetric encryption algorithm, and then uses the access information to connect to the Internet hotspot.

In step 435, the smart device successfully connects to the Internet hotspot.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Figure 5:
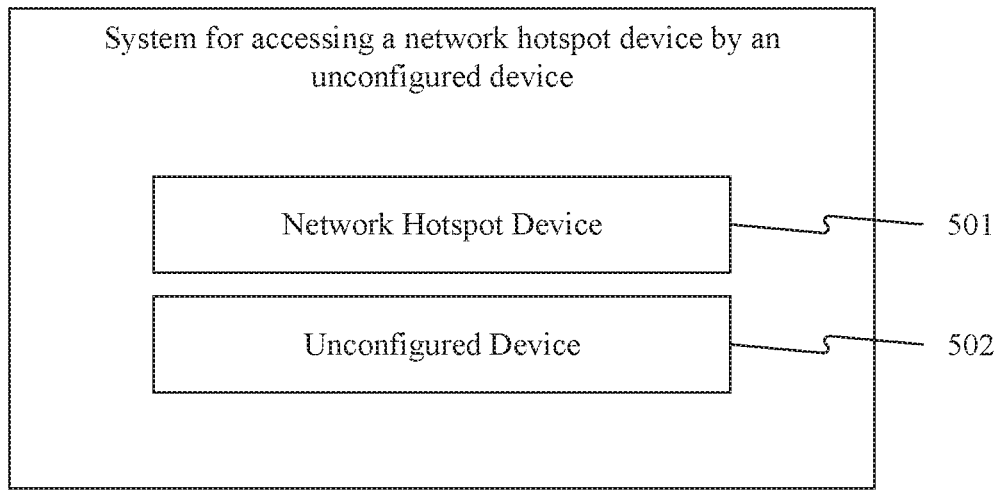
FIG. 5 illustrates a schematic diagram of an exemplary system for enabling access of an unconfigured device to a network hotspot device, consistent with some embodiments of the present disclosure.

FIG. 5 illustrates a schematic diagram of an exemplary system for enabling access of an unconfigured device to a network hotspot device, consistent with some embodiments of the present disclosure. The apparatus can include a network hotspot device 501 and an unconfigured device 502.

Network hotspot device 501 is used to create a first hotspot and a second hotspot; and after the first access information of the first hotspot is updated, network hotspot device 501 disconnects unconfigured device 502 that has accessed the first hotspot from network hotspot device 501.

Unconfigured device 502 is used to access the second hotspot.

Network hotspot device 501 is used to obtain the device information sent by unconfigured device 502 through the second hotspot, use the device information to encrypt the updated first access information, and send the encrypted first access information to unconfigured device 502.

Unconfigured device 502 is also used to decrypt the encrypted first access information by using the device information and access the first hotspot by using the decrypted first access information.

In some embodiments, network hotspot device 501 is also used to determine whether unconfigured device 502 is in the preset white list. If unconfigured device 502 is in the preset white list, network hotspot device 501 accepts the device information sent by the unconfigured device 502.

In some embodiments, network hotspot device 501 is also used to disconnect unconfigured device 502 from the second hotspot if unconfigured device 502 is not in the preset white list.

In some embodiments, network hotspot device 501 is also used to generate an encryption key using the device information and encrypt the updated first access information using the encryption keys according to a preset symmetric encryption algorithm.

In some embodiments, unconfigured device 502 is further used to generate a decryption key by using the device information and decrypting the encrypted first access information using the decryption keys according to an inverse algorithm corresponding to the preset symmetric encryption algorithm.

The system can further include a server.

Network hotspot device 501 is also used to receive a preset white list sent by the server.

In some embodiments, network hotspot device 501 is also used to add unconfigured device 502 to the preset whitelist after unconfigured device 502 accesses the first hotspot for the first time.

In some embodiments, unconfigured device 502 is further configured to access the second hotspot using preset second access information for the second hotspot.

Embodiments of the present disclosure also provide an apparatus, comprising: a memory storing a set of instructions and one or more processors configured to execute the set of instructions to cause the apparatus to perform the above-mentioned methods.

Embodiments of the present disclosure also provide a non-transitory computer readable medium that stores a set of instructions that is executable by at least one processor of a computer to cause the computer to perform the above-mentioned methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/ unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for enabling access of an unconfigured device to a network hotspot device, wherein the network hotspot device creates a first hotspot and a second hotspot, comprising:
    in response to first access information of the first hotspot having been updated, disabling, by the network hotspot device, a connection between the first hotspot of the network hotspot device and the unconfigured device that has accessed the network hotspot device through the first hotspot; and
    in response to the unconfigured device accessing the second hotspot, sending, by the network hotspot device, the updated first access information to the unconfigured device through the second hotspot, wherein the unconfigured device is configured to access the first hotspot using the updated first access information.

2. The method of claim 1, wherein sending, by the network hotspot device, the updated first access information to the unconfigured device through the second hotspot comprises:
    receiving, by the network hotspot device, device information of the unconfigured device sent by the unconfigured device through the second hotspot;
    encrypting, by the network hotspot device, the updated first access information with the device information; and
    sending, by the network hotspot device, the encrypted first access information to the unconfigured device.

3. The method of claim 2, wherein
    the encrypted first access information is configured to be decrypted with the device information by the unconfigured device, and the decrypted first access information is used to access the first hotspot by the unconfigured device.

4. The method of claim 2, wherein receiving, by the network hotspot device, the device information of the unconfigured device sent by the unconfigured device through the second hotspot comprises:
    determining, by the network hotspot device, whether the unconfigured device is in a white list; and
    in response to the unconfigured device being in the white list, accepting, by the network hotspot device, the device information sent by the unconfigured device.

5. The method of claim 4, further comprising:
    in response to the unconfigured device not being in the white list, disabling, by the network hotspot device, a connection between the unconfigured device and the second hotspot.

6. The method of claim 4, further comprising:
    receiving, by the network hotspot device, the white list from a server.

7. The method of claim 4, further comprising:
    in response to the unconfigured device having accessed to the first hotspot at the first time, adding, by the network hotspot device, the unconfigured device to the white list.

8. The method of claim 2, wherein encrypting, by the network hotspot device, the updated first access information with the device information comprises:
    generating, by the network hotspot device, an encryption key using the device information; and
    encrypting, by the network hotspot device, the updated first access information using the encryption key according to a symmetric encryption algorithm.

9. The method of claim 8, wherein
    a decryption key is generated by the unconfigured device using the device information, the decryption key is used to decrypt the encrypted first access information according to an inverse algorithm corresponding to the symmetric encryption algorithm.

10. The method of claim 1, wherein
    second access information of the second hotspot is used to access the second hotspot by the unconfigured device.

11. An apparatus for enabling access of an unconfigured device to a network hotspot device, comprising:
    a memory storing a set of instructions; and one or more processors configured to execute the set of instructions to cause the apparatus to perform:

in response to first access information of the first hotspot having been updated, disabling a connection between the first hotspot of the network hotspot device and the unconfigured device that has accessed the network hotspot device through the first hotspot; and in response to the unconfigured device accessing the second hotspot, sending the updated first access information to the unconfigured device through the second hotspot, wherein the unconfigured device is configured to access the first hotspot using the updated first access information.

12. A non-transitory computer readable medium that stores a set of instructions that is executable by at least one processor of a computer to cause the computer to perform a method for enabling access of an unconfigured device to a network hotspot device, the method comprising:

in response to first access information of the first hotspot having been updated, disabling a connection between the first hotspot of the network hotspot device and the unconfigured device that has accessed the network hotspot device through the first hotspot; and in response to the unconfigured device accessing the second hotspot, sending the updated first access information to the unconfigured device through the second hotspot, wherein the unconfigured device is configured to access the first hotspot using the updated first access information.

13. The non-transitory computer readable medium of claim 12, wherein sending the updated first access information to the unconfigured device through the second hotspot comprises:

receiving device information of the unconfigured device sent by the unconfigured device through the second hotspot;

encrypting the updated first access information with the device information; and sending the encrypted first access information to the unconfigured device.

14. The non-transitory computer readable medium of claim 13, wherein the encrypted first access information is configured to be decrypted with the device information, and the decrypted first access information is used to access the first hotspot.

15. The non-transitory computer readable medium of claim 13, wherein receiving the device information of the unconfigured device sent by the unconfigured device through the second hotspot comprises:

determining whether the unconfigured device is in a white list; and in response to the unconfigured device being in the white list, accepting the device information sent by the unconfigured device.

16. The non-transitory computer readable medium of claim 15, wherein the at least one processor configured to execute the set of instructions to cause the computer to further perform:

in response to the unconfigured device not being in the white list, disabling a connection between the unconfigured device and the second hotspot.

17. The non-transitory computer readable medium of claim 15, wherein the at least one processor configured to execute the set of instructions to cause the computer to further perform:

receiving the white list from a server.

18. The non-transitory computer readable medium of claim 15, wherein the at least one processor configured to execute the set of instructions to cause the computer to further perform:

in response to the unconfigured device having accessed to the first hotspot at the first time, adding the unconfigured device to the white list.

19. The non-transitory computer readable medium of claim 13, wherein encrypting the updated first access information with the device information comprises:

generating an encryption key using the device information; and encrypting the updated first access information using the encryption key according to a symmetric encryption algorithm.

20. The non-transitory computer readable medium of claim 19, wherein a decryption key is generated using the device information, the decryption key is used to decrypt the encrypted first access information according to an inverse algorithm corresponding to the symmetric encryption algorithm.

* * * * *